United States Patent [19]

Lyons et al.

[11] Patent Number: 4,787,698

[45] Date of Patent: Nov. 29, 1988

[54] METHODS OF AND APPARATUS FOR RECONFIGURING OPTICAL FIBER CONNECTOR COMPONENTS AND PRODUCTS PRODUCED THEREBY

[75] Inventors: Robert P. Lyons, Middlesex County, N.J.; John M. Palmquist, Gwinnett County, Ga.; Susan S. Sachs, Middlesex County; Ralph A. Treder, Jr., Mercer County, both of N.J.; Thomas L. Williford, Jr., Gwinnett County, Ga.

[73] Assignees: American Telephone and Telegraph Co., AT&T Bell Labs, Murray Hill; AT&T Technologies, Inc., Berkeley Heights, both of N.J.

[21] Appl. No.: 802,500

[22] Filed: Nov. 27, 1985

[51] Int. Cl.$^4$ .............................................. G02B 6/36
[52] U.S. Cl. ................................................ 350/96.20
[58] Field of Search ............... 350/96.20, 96.21, 96.22; 51/134.5 R, 165.71, 165.72, 283 R, 290; 73/865.8; 356/73.1, 121; 358/101, 107

[56] References Cited

U.S. PATENT DOCUMENTS

| 3,864,018 | 2/1975 | Miller | 350/96.21 |
| 4,107,242 | 8/1978 | Runge | 350/96.21 |
| 4,384,431 | 5/1983 | Jackson | 51/283 R |
| 4,452,506 | 6/1984 | Reeve et al. | 350/96.20 |
| 4,492,060 | 1/1985 | Clark | 51/283 R |
| 4,512,630 | 4/1985 | Runge | 350/96.21 |
| 4,539,776 | 9/1985 | Weaver, Jr. | 51/283 |
| 4,623,156 | 11/1986 | Moisson et al. | 350/96.20 |
| 4,673,245 | 6/1987 | Kling et al. | 350/96.20 |

OTHER PUBLICATIONS

W. C. Young et al, "Low Loss Field–Installable Biconic Connectors for Single Mode Fibers" paper MG4 OFC '83, 28 Feb.–2 Mar. 1983.

N. K. Cheung et al, "An Automatic Inspection System for Single Fiber Connector Plugs", Symposium on Optical Fiber Measurements 1980.

Primary Examiner—William L. Sikes
Assistant Examiner—Frank González
Attorney, Agent, or Firm—Edward M. Somers

[57] ABSTRACT

A biconic connector (40) includes two plugs (44–44) each of which terminates a single fiber optical cable (55) and each of which includes a truncated conically shaped end portion (50). The connector also includes an alignment sleeve having back-to-back conically shaped cavities each of which is adapted to receive an end portion of a plug. In order to minimize loss through the connection, it becomes important for the centroid of the cross-sectional area of a light beam in the end face of the plug to be coincident with the axis of revolution of the conically shaped surface of plug. This is accomplished by holding the plug in a fixture such that its end portion is exposed and the fixture adapted to be turned about an axis of rotation. Images of a light beam launched into the optical fiber are acquired in a plane through the end face of the plug. From these, the axis of rotation is determined and adjustments made to cause the centroid of the acquired images to become substantially coincident with the axis of rotation of that plane. Subsequently, the molded plug is reconfigured such as by grinding to cause the centroid of the cross-sectional area of the light beam in the end face of the plug to be disposed along the axis of revolution of the conical surface of the reconfigured plug.

25 Claims, 8 Drawing Sheets

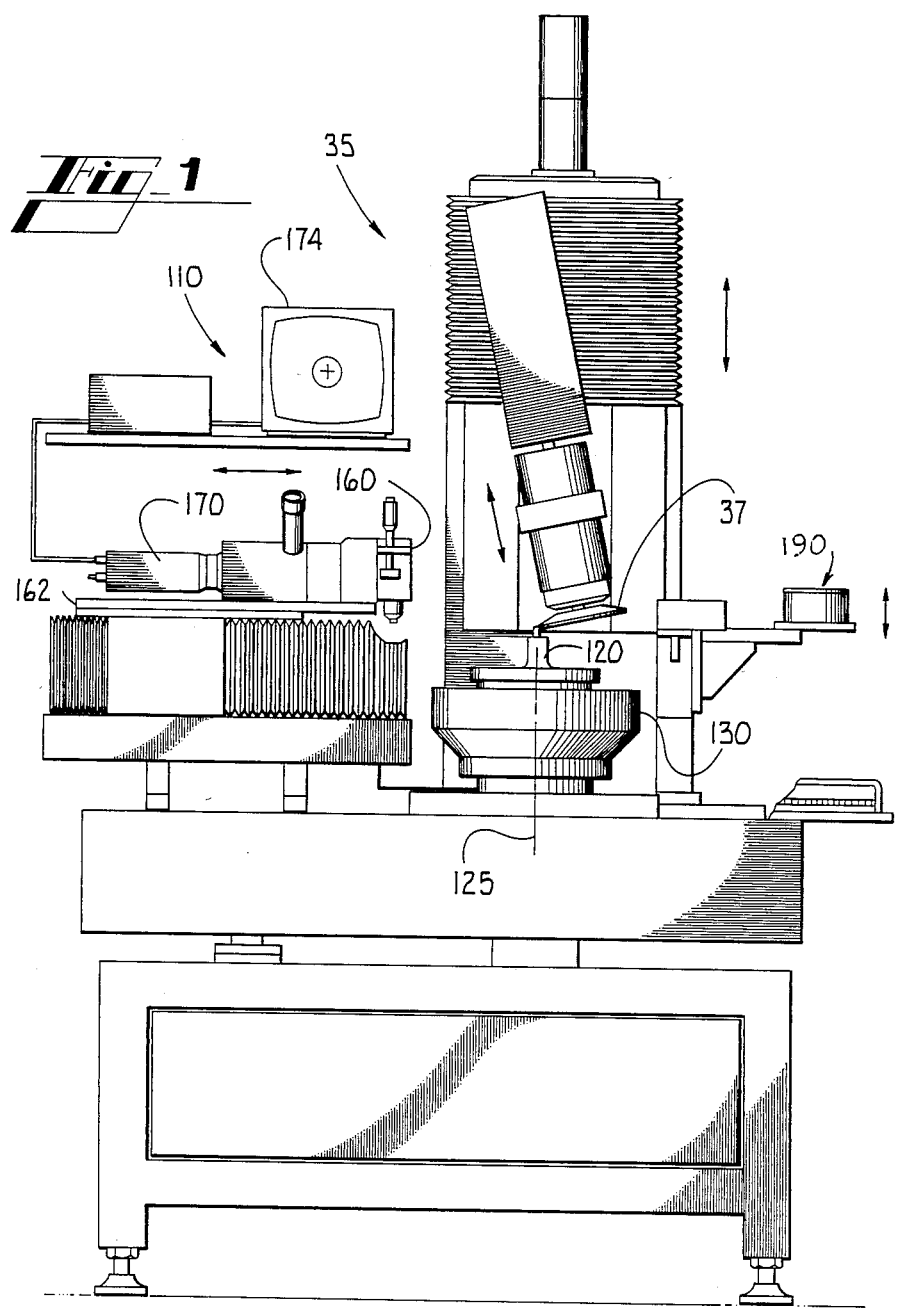

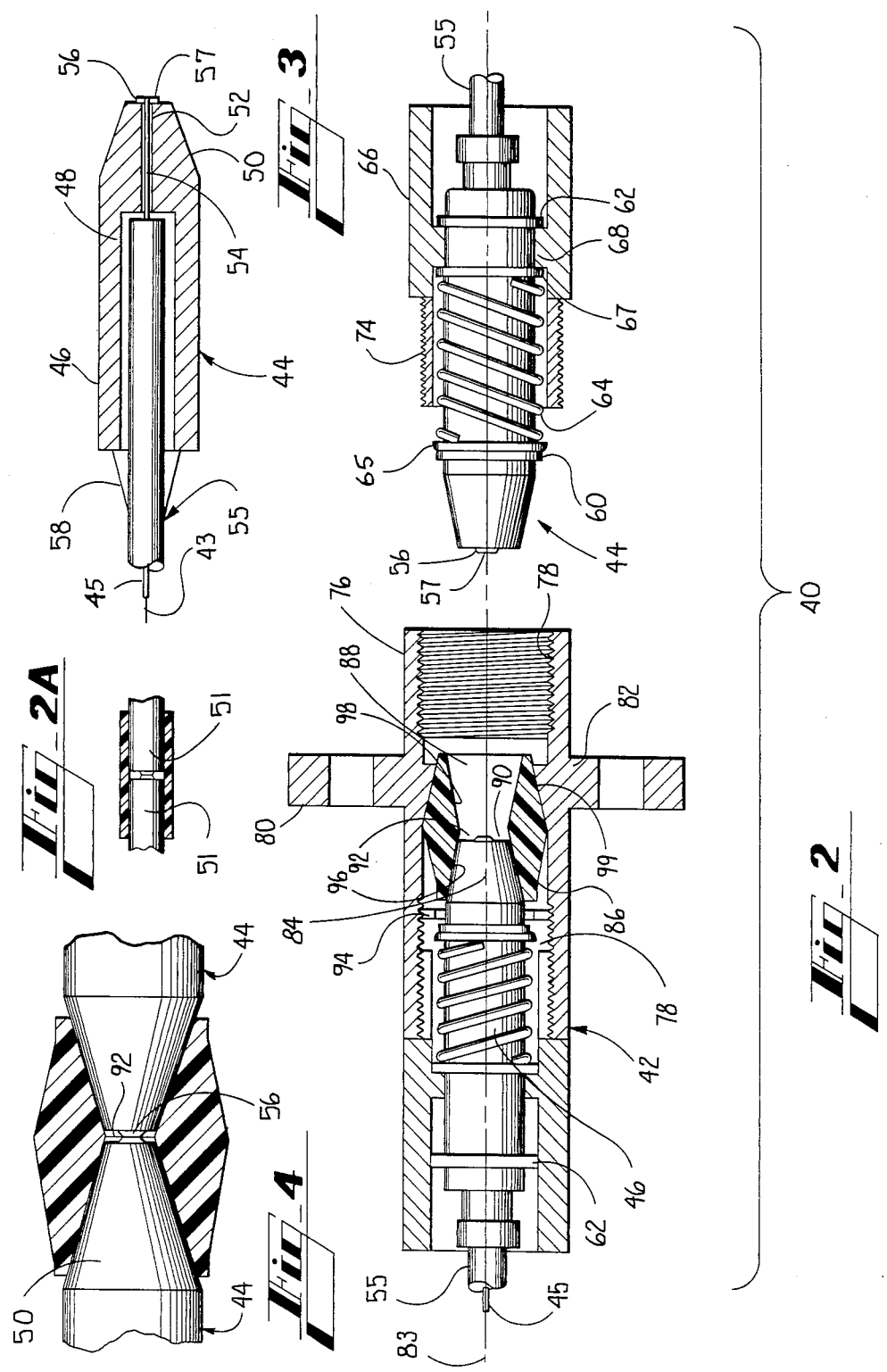

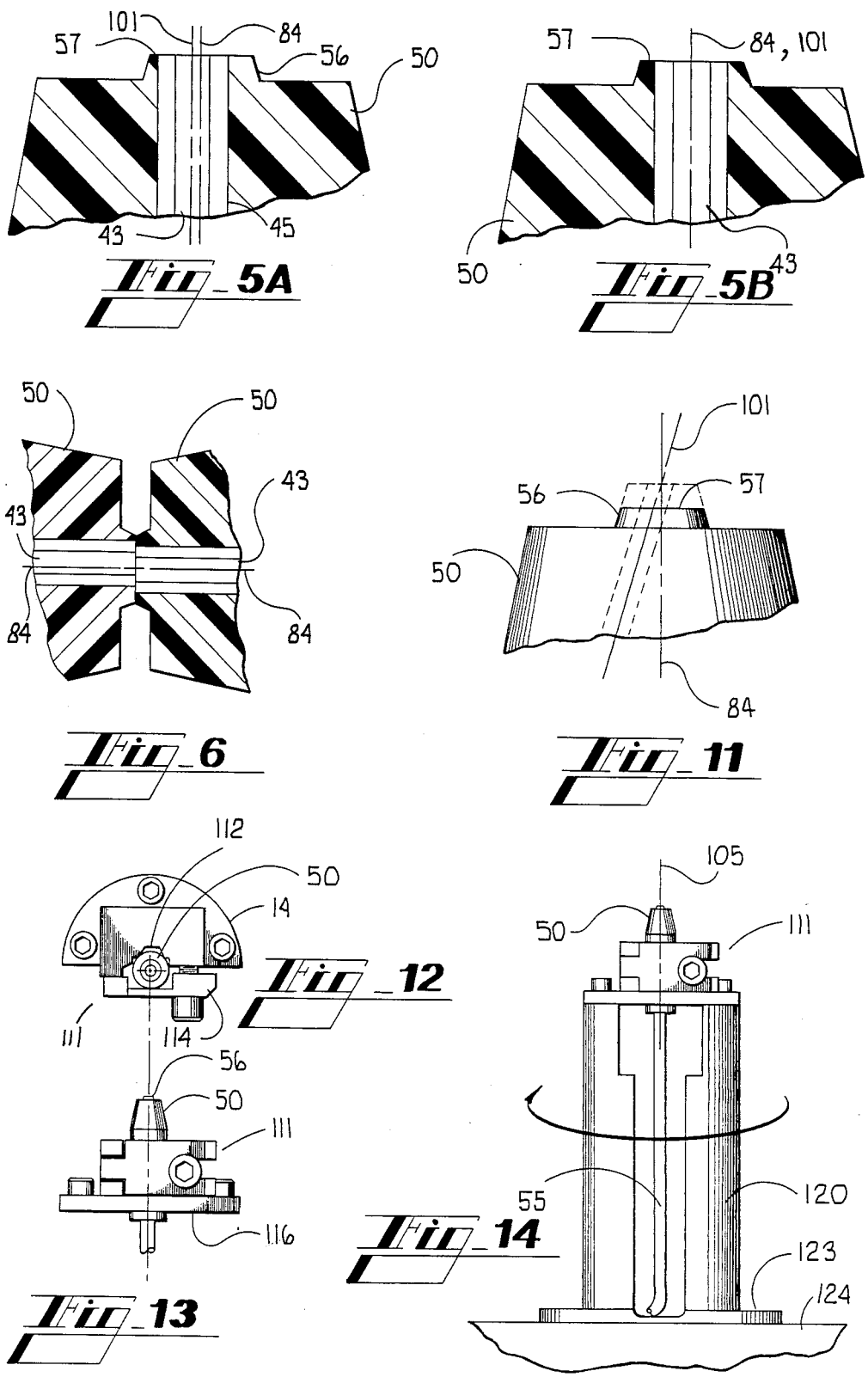

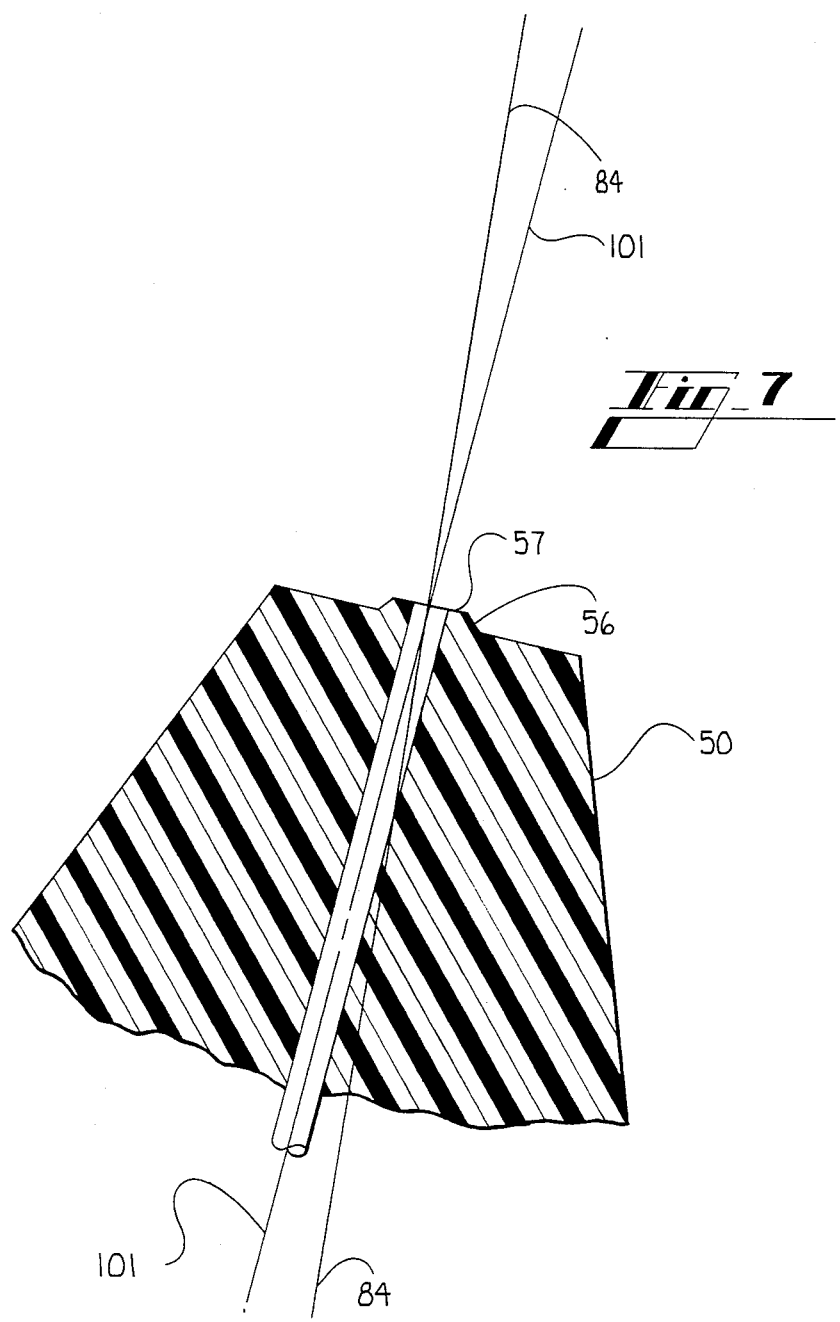

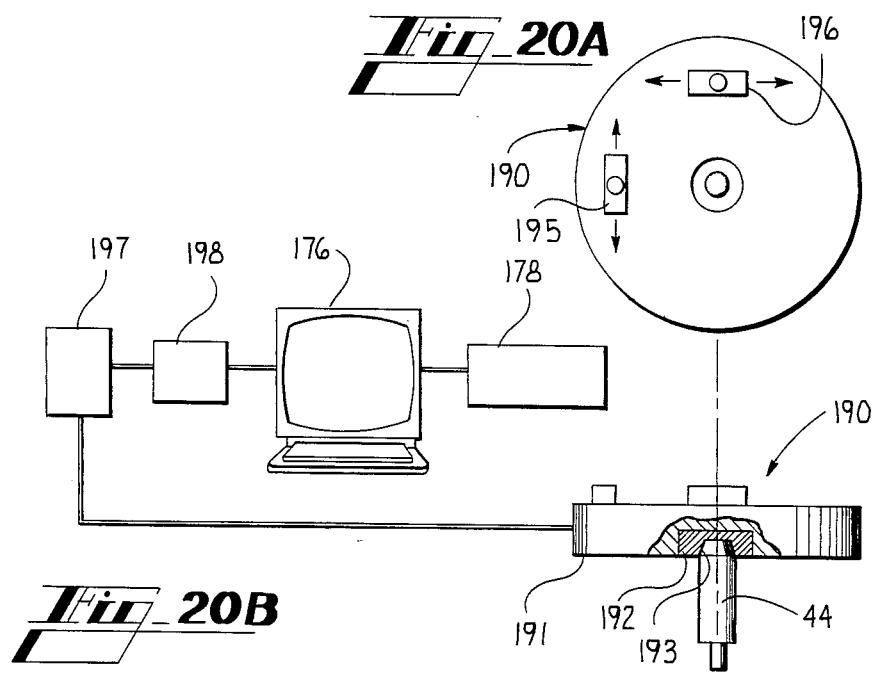
*Fig_20A*
*Fig_20B*
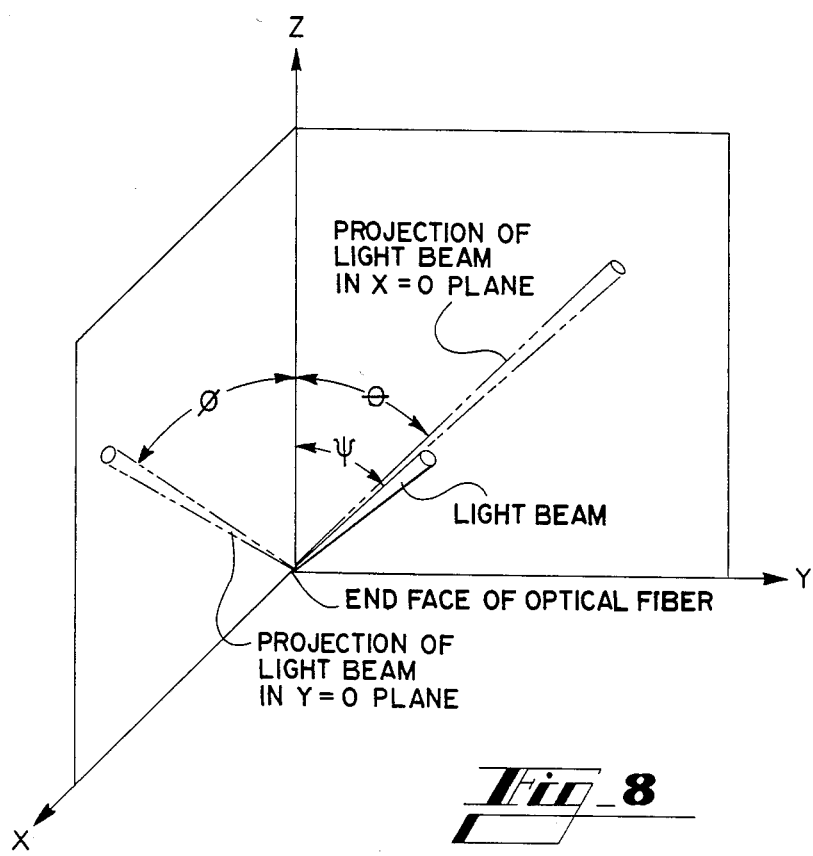
*Fig_8*

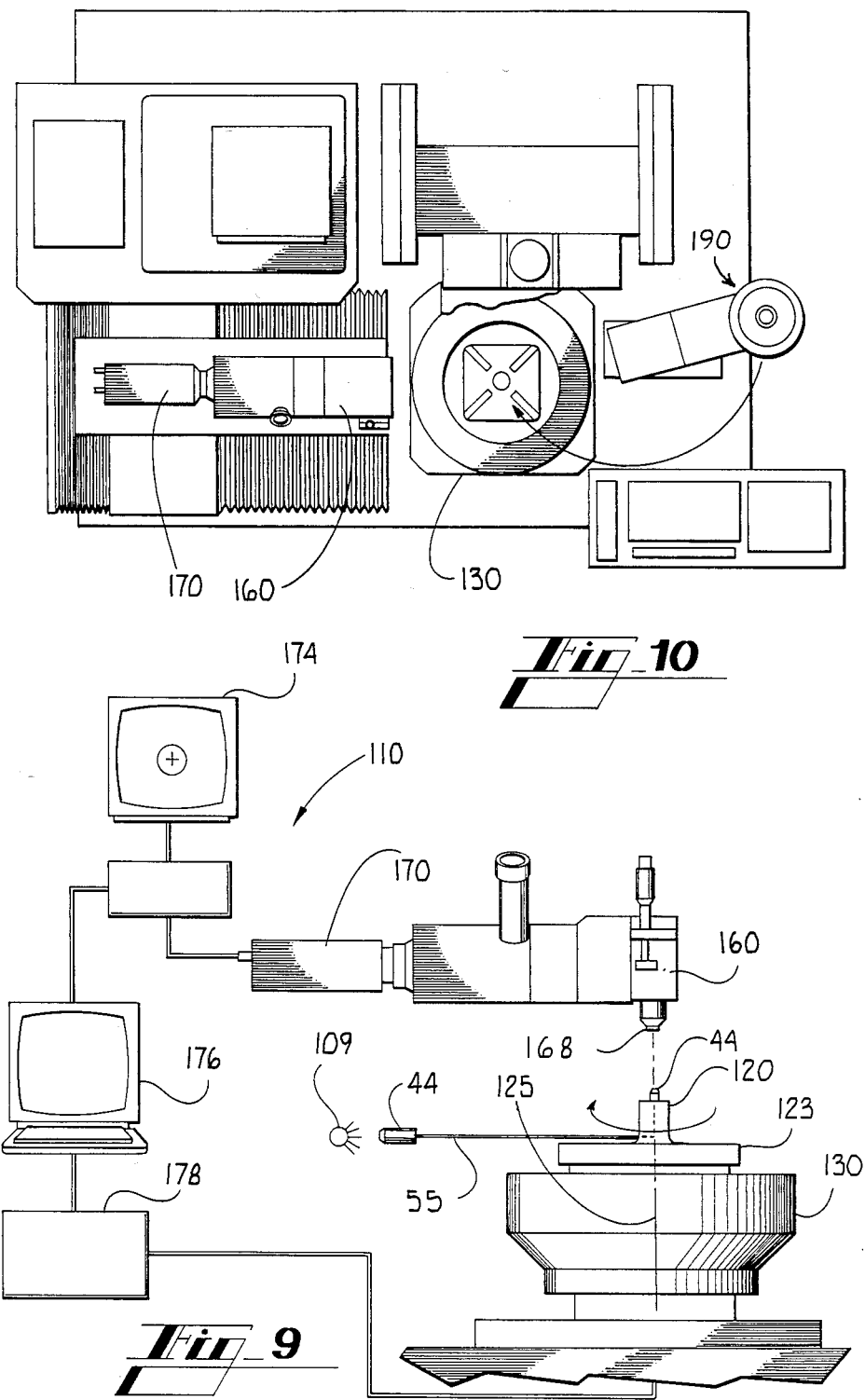

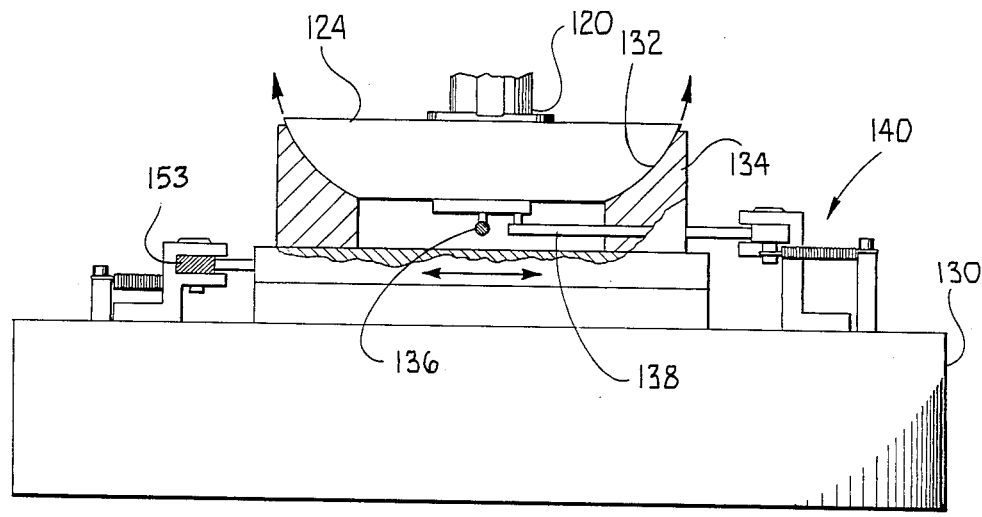
Fig_15
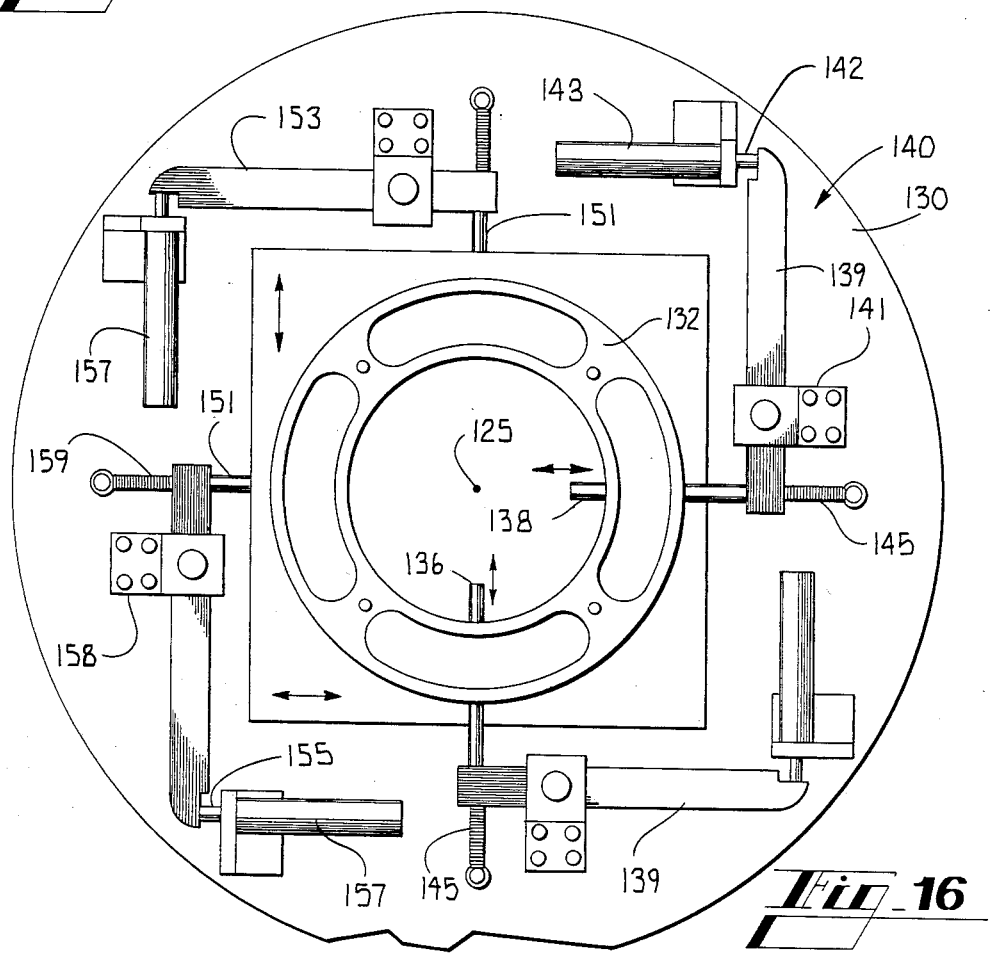
Fig_16

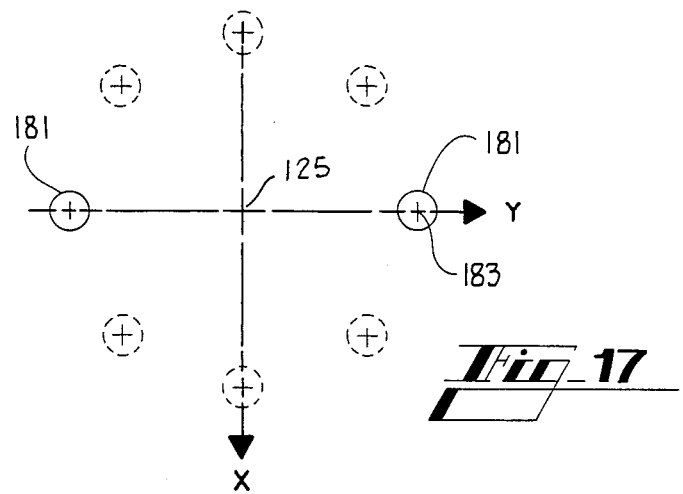
_Fig. 17_
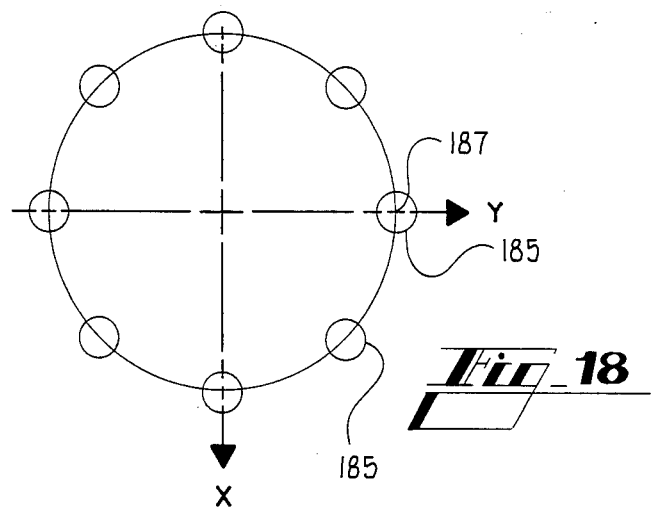
_Fig. 18_
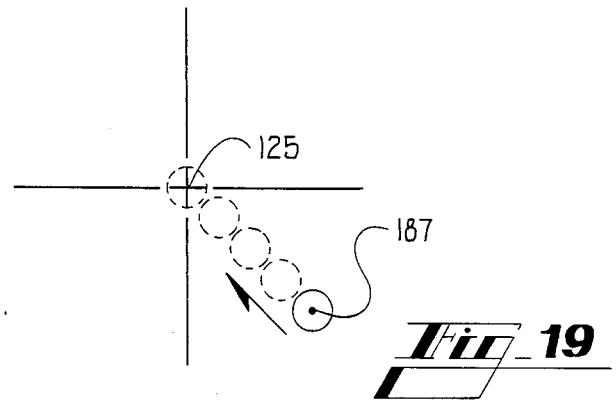
_Fig. 19_

METHODS OF AND APPARATUS FOR RECONFIGURING OPTICAL FIBER CONNECTOR COMPONENTS AND PRODUCTS PRODUCED THEREBY

TECHNICAL FIELD

This invention relates to methods of and apparatus for reconfiguring optical fiber connector components and products produced thereby. More particularly, this invention relates to post-molding methods and apparatus for grinding an optical fiber termination plug to cause a centroid of a passageway therethrough or fiber core therein at an intersection with an end face of the plug to be coincident with the axis of revolution of a conical surface of the plug. As a result, when the plugs are mounted in an alignment sleeve, the passageways or fiber cores are aligned suitably.

BACKGROUND OF THE INVENTION

The use of optical fibers in communications is growing at an unprecedented rate. Low loss optical fibers which are produced by any one of several techniques may be assembled into ribbons which are then assembled into cables, or stranded into cables, or they may be enclosed singularly in a jacket and used in various ways in a central office, for example.

In order to assure that the low loss fibers which are produced today are not diminished in their effectiveness in systems, the fibers must be connected through intermateable connectors which preserve those low losses. For fiber ribbons, connectors comprise grooved chips which hold a plurality of fibers of one ribbon in alignment with fibers of another ribbon. Such a connector is shown for example in U.S. Pat. No. 3,864,018 which issued on Feb. 4, 1975 in the name of C. M. Miller.

For single fiber cables, connections may be made through a connector which is referred to as a biconic connector. See U.S. Pat. Nos. 4,107,242 and 4,512,630 which issued on Aug. 15, 1978 and Apr. 23, 1985, in the name of P. K. Runge. That connector includes a housing in which is mounted a biconic alignment sleeve. The sleeve includes two truncated, conically shaped cavities which communicate with each other through a common plane which has the least diameter of each cavity. Each of two fibers to be connected is terminated with a plug comprising a primary pedestal or truncated, conically shaped end portion which is adapted to be received in one of the cavities of the sleeve. The conically shaped surfaces of the plug and of the sleeve serve as alignment surfaces. The fiber extends through a passageway in the plug and has an end which terminates in a secondary pedestal of the plug. Generally a plug is molded about an end portion of an optical fiber; however, there is a demand for plugs having passageways for receiving optical fibers in the field. A cylindrically shaped portion of the plug is connected to the truncated end. The plug is urged into seated engagement with the wall defining the cavity in which it is received.

Minimal loss between the connected fibers is achieved when the cores of fibers which are terminated by the plugs are aligned coaxially and when the longitudinal offset along the axes of the plugs is zero and fiber end faces, each of which is planar, contact in a common plane. Considering the size of the fibers, for example one with a core diameter of 8 microns and a cladding diameter of 125 microns, the task of providing conical plug and sleeve surfaces in order to meet alignment and end separation requirements is a formidable one. Generally, the plugs are molded from a transfer molding grade epoxy composition material. Although the surface tolerances which are achieved when molding the alignment sleeves and conic tapers are excellent, they are not sufficient to achieve consistently the desired alignment and end separation.

Problems arise because the opening in the end face of the pedestal and hence the fiber core may not be centered with respect to the axis of revolution of the conically shaped surface of the plug. The axis of revolution of a conically shaped end portion also may be referred to as its conical axis. As a result, the cores of the fibers terminated by two plugs held in the sleeve may have sufficient transverse offset to affect adversely transmission of signals.

The flow of molten material during a molding process which is used to manufacture biconic connectors causes the optical fiber end portion about which a plug is molded or a passageway which is adapted to receive an optical fiber to be disposed along an axis which may not be parallel to the axis of the plug. The angle between the fiber axis and the axis of revolution is commonly referred to as the "exit angle" of the connector. Consequently, the light emitted from one optical fiber may not be parallel to the axis of the receiving fiber. This problem is referred to as angular offset.

Control of the exit angle is essential for achieving low loss connections and high yields in single mode connector manufacture. This has been achieved by methods and apparatus which are disclosed and claimed in commonly assigned, U.S. Pat. No. 4,721,357 which was filed of even date herewith in the names of J. Kovalchick, J. Mark Palmquist, and R. Treder. Control of this parameter is necessary so that when two plugs are disposed in an alignment sleeve, not only will the end faces just touch, but the fiber axes will be coaxial.

Seemingly, the prior art is devoid of a simple solution to the problem of providing production plugs at a relatively high yield for biconic connectors which may be used for multi or single mode lightguide fibers. Each production plug must be such that a centroid of the core of an optical fiber terminated therein in an end face of the plug is coincident with the axis of revolution of the truncated, conically shaped surface of the plug. Desirably, the solution does not require additional elements or time in the connection procedures, but instead involves an automatic adjustment of molded plugs to achieve precision without the need of a skilled machinist. What is needed are methods and apparatus for measuring the exit angle and correcting for transverse offset of the optical fibers from the axis of revolution of the end portion of the plug and reconfiguring a new end portion having an axis which is coincident with the centroid of the fiber core or the passageway at an end face of the fiber.

SUMMARY OF THE INVENTION

The foregoing problem of lateral offset has been solved by the methods and apparatus of this invention. A method is provided to reconfigure an end portion of a plug, which includes a passageway and which is adapted to terminate an optical fiber, to cause an end face of the fiber to occupy a predetermined position with respect to an alignment surface of the end portion of the plug.

The plug is held in a fixture having an axis of rotation such that the end protion of the plug is exposed. Then the location of the axis of rotation in an end face of the plug is determined and the plug is moved to cause the centroid of the cross sectional area of a beam of light within the passageway at the end face of the plug to be disposed along the axis of rotation. In this application, centroid of a core of the optical fiber or of the beam of light is defined as the center of mass of a thin uniform plate having the same transverse cross section as the core or beam of light. The centroidal axis is a line determined by two centroids of the core or beam of light which are spaced along the core or beam of light. The end portion of the plug is reconfigured to cause the centroid of the cross sectional area of the light beam to be in a predetermined location with respect to an alignment surface of the reconfigured end portion.

Typically, an end portion of an optical fiber is inserted into a passageway of a truncated, conically molded plug or a plug is molded about the fiber so that the fiber extends slightly past a pedestal at the small diameter portion of the plug. The optical fiber is severed and the fiber end and end of the pedestal are polished in such a way as to cause the end face to be perpendicular to the conical axis.

The truncated, conically shaped end portion of the plug is reconfigured to cause a centroid of an optical fiber core at an end face of the plug to be disposed along the axis of revolution of the end portion of the plug. The plug is held in the fixture such that the end portion is exposed. A light beam is launched along the passageway and an image is acquired of the illuminated cross-sectional area of the light beam while relative motion is caused between the light beam and a device which is used to acquire the image. The light beam as it appears in the end face of the plug occupies different positions along a circular path, the center of which is the axis of rotation of the fixture. The centroid of the cross sectional area of the light beam is determined at a plurality of points which are sufficient to determine the circular path it traces and the center of rotation of the fixture is determined. Then the centroid of the light beam is caused to be coincident with the center of rotation of the fixture. Afterwards, the end portion of the plug is reconfigured to cause the centroid of the cross sectional area of the light beam to be coincident with the axis of revolution of the reconfigured end portion.

It should be understood that the term reconfiguring is intended to cover various techniques for causing the plug to be restructured to cause an alignment surface of the plug to be in a predetermined location with respect to the centroid of the cross sectional area of the light beam. Such techniques include grinding a molded plastic plug or machining a metal plug. The alignment surface of the end portion of the plug may be cylindrical, conical or flat.

BRIEF DESCRIPTION OF THE DRAWINGS

Other objects and features of the present invention will be more readily understood from the following detailed description of specific embodiments thereof when read in conjunction with the accompanying drawings, in which:

FIG. 1 shows an elevational view of an apparatus which is used to reconfigure a truncated, conically-shaped optical fiber terminating plug in accordance with the methods of this invention;

FIG. 2 is an elevational view of a biconic connector arrangement for optical fiber cables which includes an alignment sleeve and two plugs each of which terminates an optical fiber;

FIG. 2A is a detail elevational view of a connector arrangement which includes two cylindrically shaped plugs and an alignment sleeve;

FIG. 3 is a detail view of a portion of a biconic connector plug;

FIG. 4 is a detail view of end portions of two plugs held within an alignment sleeve;

FIGS. 5A-5B are detail views of plug end portions which terminate optical fibers to show a lateral offset condition which may exist and which may affect optical performance and to show the desired configuration in which the centroid of the fiber core coincides with the axis of revolution of the end portion of the plug;

FIG. 6 is a view of two plug end portions in an alignment sleeve to show misalignment of the fiber core in one plug from the fiber core in another plug;

FIG. 7 is a detail view of a portion of a plug end portion to illustrate several axes of interest;

FIG. 8 is a perspective view of a coordinate system convention which is used with methods of this invention;

FIG. 9 is an elevational view of a portion of the apparatus of FIG. 1 which is used to reshape the conical configuration of a plug in response to meansurements of lateral offset;

FIG. 10 is a plan view of the apparatus of FIG. 9;

FIG. 11 is an enlarged view of a plug end after it has been polished;

FIGS. 12 and 13 are detail plan and elevational views of a holder for a plug;

FIG. 14 is a detail elevational view of a pedestal which supports the holder of FIG. 12;

FIG. 15 is a side elevational view of a support for a biconic connector plug;

FIG. 16 is a plan view of the support of FIG. 15;

FIGS. 17-19 are a sequence of views which depict the steps of a method of adjusting a biconic connector plug;

FIG. 20A is a plan view of a sensing device; and

FIG. 20B is an elevational view which shows the device of FIG. 20A in position on a plug end to be reconfigured.

DETAILED DESCRIPTION

Referring now to FIG. 1, there is shown an apparatus 35 which includes a rotatably and reciprocally mounted grinding tool 37 that is used to reconfigure a biconic connector which is designated generally by the numeral 40 and shown in FIGS. 2 and 3. The biconic connector 40 includes a housing 42 for receiving two plugs 44—44 each of which terminates a lightguide or optical fiber 45 having a core 43. Both the plug and the housing are made of a crushed silica, transfer molding grade epoxy composition, for example. As can be seen in FIG. 3, each plug 44 includes a cylindrical portion 46 which includes a bore 48, and an end portion 50 having a truncated conical shape. The end portion 50 includes a passageway 52 that communicates with the bore 48. FIG. 2A shows another arrangement in which two plugs 51—51 are cylindrical.

A coated single optical fiber 45 which has been jacketed with a plastic material such as polyvinyl chloride is terminated with a plug 44 at each of its ends. The terinated, jacketed optical fiber is referred to as a single fiber or jumper cable 55. The jacketing material and the coating may be removed from an end portion 54 of the single fiber cable. A cable is inserted into the bore 48 until the bared end portion 54 is received in the passageway 52 with an end portion of the fiber 45 extending into a secondary pedestal 56 having an end face 57. In the alternative, a plug is molded about an end portion of an optical fiber. After being polished in accordance with methods and apparatus disclosed and claimed in U.S. Pat. No. 4,539,776, which issued on Sept. 10, 1985 in the name of F. R. Weaver, Jr. and which is incorporated by reference herein, an end face of the fiber 45 is coincident with the end face of the secondary pedestal 56. The cable at its exit from the bore 48 is provided with a strain relief member 58.

Each plug 44 is provided with retaining rings 60 and 62. The retaining ring 60 abuts a collar 65 which is fixedly located about the plug 44. A compression spring 64 is disposed about the cylindrical portion 46 of the plug between the collar 65 and a collar 67. The plug 44 is positioned in an end portion of a threaded holder 66 with the collar 67 in engagement with an annular lip 68 interior to the holder. The retaining ring 62 is disposed about the cylindrical portion 46 of the plug 44 on the other side of the lip 68 to hold the plug within the holder. A threaded portion 74 extends from the holder 66 and the single fiber cable 55 extends in the other direction from within the holder 66.

A center portion 76 of the housing 42 is adapted to receive the two threaded plug holders 66—66 and two plugs 44—44. The center portion 76 includes two opposed internally threaded cavities 78—78 and a flange 80 adapted to be mounted to a supporting surface. The flange 80 is aligned with an internally disposed annular collar 82 which extends toward a longitudinal axis 83 of the housing. An axis 84 is the axis of revolution of the truncated conically shaped end portion 50 and often is referred to as the conical axis. The center portion 76 of the housing also is adapted to receive an alignment sleeve 86 which comprises two opposed truncated, conically shaped cavities 88 and 90 which meet at a common plane 92.

The alignment sleeve 86 is disposed within the portion 76 of the housing so that when the plugs 44—44 are mounted in the holders 66—66 and the threaded portions 74—74 turned into the cavities 78—78, the ends 50—50 of the plugs are received in the cavities 88 and 90 with the secondary pedestals in the vicinity of the common plane 92. Also, as the threaded portions 74—74 are turned into the housing portion 76, the plug portions 46—46 are moved through the openings defined by the lips 68—68 to move the retaining rings 62—62 out of engagement with the lips (see left side of FIG. 2). The retaining ring 60 of the left plug as viewed in FIG. 2 is adjacent to a sleeve retaining ring 94. The spring 64 causes the plug end portion 50 to be seated firmly in engagement with a wall 96 of the alignment sleeve. The ring 94 is threadably secured inside the housing portion 76 and although not necessarily in engagement with the sleeve, it prevents the sleeve from being removed inadvertently from the housing. Further, the right plug end 50 as viewed in FIG. 2 is moved into the cavity 88 of the alignment sleeve 86 and contacts a wall 98. The sleeve 86 may float within an opening 99 in the collar 62 to facilitate alignment of the two plugs 44—44.

Ideally, to achieve minimum loss, the plugs 44—44 disposed within the sleeve 86 should have the end faces of the fibers within the secondary pedestals 56—56 aligned with the axes of revolution of the conical end portions 50—50 and contacting each other (see FIG. 4) or at worst spaced apart a slight predetermined distance. The outer surface of the conical end portion 50 of each plug 44 and the surfaces of the walls 96 and 98 of the sleeve cavities are associated alignment surfaces which are intended to cause the desired positioning of the pedestals 56—56 when the conical end portions of the plugs are received in the sleeve 86. The problem is that the centroid of the core of the optical fiber or the centroid of the passageway in the plug as molded is not necessarily coincident with the conical axis 84 of the end portion of the plug in the end face 57.

Referring now to FIG. 5A, there is shown a lateral offset which may exist when using as-molded plugs. In FIG. 5A, for example, it can be seen that the centroid of the end of the core 43 of a plug-terminated optical fiber is offset from the conical axis 84 of the plug. As a result, when two plugs 44—44 are received in an alignment sleeve, the centroids of the cores 43—43 being in a predetermined location with respect to those alignment surfaces are misaligned (see FIG. 6). As can be seen in FIG. 5A, an end face of the optical fiber terminates in a pedestal and is perpendicular to the conical axis. However, an axis 101 of the optical fiber typically is not coincident with the conical axis 84 (see FIGS. 5A and 7). Not only does it genrally have a lateral offset therefrom where the fiber intersects the end face of the pedestal 56 as shown in FIG. 5A, but it may have an angular offset or exit angle with respect to that axis. In FIG. 8, it can be seen that a beam of light emerges from an end portion of an optical fiber at an angle $\psi$ to a vertical axis. The final product desirably includes a truncated, conically shaped end portion in which the intersection of the centroid of the optical fiber core and the end face of the plug 44 is coincident with the conical axis (see FIG. 5B). The lateral offset of the centroid of the fiber core 43 from the axis 84 is corrected by the methods and apparatus of this invention whereas the exit angle correction is made in accordance with the invention disclosed and claimed in priorly mentioned U.S. Pat. No. 4,721,357.

In prior art manufacture, in order to provide finished plugs without substantial lateral offset, the plugs have been reground based upon visual observations by an operator and subjective correction controlled by the operator. It is desired to have observations and corrections based upon those observations made without being subject to human error. For a plug terminated optical fiber, this goal is accomplished by determining, without operator input, the lateral offset of the centroid of the fiber core 43 at an end face 57 of the plug from the center of rotation of the plug, and then in response to that determination, repositioning the plug and reconfiguring it to cause the centroid of the core of the optical fiber in the plane of the end face of the plug to coincide with the conical axis. For a plug having a passageway for field termination of an optical fiber, this is accomplished with respect to the centroid of the passageway. The remainder of this description deals with the adjustment of a plug which terminates an optical fiber.

Information is obtained as to lateral offset by introducing light from a source 109 into an end of a jumper cable 55 not being processed (see FIG. 9), and processing light emitted from an end to be processed by a machine vision system 110 (see also FIGS. 1, 9 and 10).

Examples of commercially available machine vision systems are one manufactured by International Robomation-Intelligence, Inc. and designated P256, and one manufactured by View Engineering Co. and designated model 719. As will be recalled, the jumper cable 55 includes a length of jacketed optical fiber 45 each end of which is terminated with a plug 44. A machine vision system is a system which acquires images of light emanating from an article and which provides an output based on an analysis of the acquired images. Such an analysis can be used to determine properties of the article such as, for example, orientation, and any change in those properties as a result of an action taken in response to the output.

The first step in detecting and measuring lateral offsets which may be referred to as XY offsets is to establish a frame of reference in three dimensions to which angles and positions can be referred for each new plug to be measured. The machine vision system refers to the center of symmetry of the emitted light images detected as the turntable rotates, and this also is the axis around which the tool 37 shapes the cone. That axis is a natural standard reference orientation. For this description, an axis which is parallel to the axis of rotation is called the Z axis. The X axis is normal to the Z axis, as is the Y axis (see FIG. 8).

Prior to the measurement and further processing of the plug 44, its end face is polished in accordance with the disclosure of priorly mentioned U.S. Pat. No. 4,539,776. When so polished, the end face is normal to the conical axis. When the end face is polished, the axis 101 the fiber core 43 which initially may have intersected the conical axis 84 in the plane of the end face is more offset from the conical axis in the plane of the end face newly formed by the polishing operation (see FIG. 11).

Unlike prior art measurement techniques, this invention is directed to an automatic technique for reconfiguring the truncated conically shaped end portion 50 of a plug 44. Consequently, the plug 44 cannot be mounted by inserting its conically shaped end into a fixture having a mating opening, rather it must be held at its lower end to expose the conically shaped portion.

In the operation of the apparatus 35, an operator causes a conically shaped plug 44 to become held in a chuck 111 which comprises a V-block 112 having a pivotally mounted retaining lever 114 (see FIGS. 12 and 13). The plug 44 is held in the chuck 111 so that its annular groove is disposed just below a surface 116 of the chuck to permit a leaf (not shown) to become disposed in the groove and futher hold the plug in the chuck. The plug 44 terminates one end of an optical fiber included in a jumper cable 55. The other end of the jumper cable 55 is connected to the light source 109 (see FIG. 9) such as a light emitting diode which causes the light beam to be launched into and along the core of the optical fiber.

The chuck 111 is supported on a pedestal 120 (see FIG. 14) which permits it to be exposed to a grinding tool 37 (see FIG. 1). The pedestal 120 is supported through a mounting ring 123 by a spherical bearing 124 which is mounted on a turntable 130 (see FIGS. 15 and 16) having an axis of rotation 125. In elevating the plug from the spherical bearing, the pedestal facilitates bending of the fiber cable. Secondly, the tip of the plug 44 is elevated so that it is positioned at the center of curvature of the spherical bearing.

As can be seen in FIGS. 15 and 16, the bearing 124 is engaged by a mating surface 132 of a support 134, which is mounted on the turntable 130. The bearing 124 is adapted to be tilted in angular coordinate directions $\theta$ and $\phi$ by a positioner 140 including arms 136 and 138 each of which extends through the support 134 and includes an arm 139 which is mounted pivotally in a support 141. An end of each arm 139 is engaged by a plunger 142 of a precision motor 143. A spring 145 urges each arm 136 and 138 in a direction outwardly of the bearing.

Further as can be seen in FIGS. 15 and 16, the bearing support 134 is adapted to be moved in X and Y coordinate directions by a translator portion of the positioner 140. Each portion of the translator includes a force applicator 151 mounted at one end of an arm 153 that is engaged by a plunger 155 of a precision motor 157. The arm 153 is supported for pivotal movement in a bearing 158 and is biased outwardly by a spring 159.

It also should be understood that whereas in the preferred embodiment of this invention, the axis of rotation 125 of the apparatus 35 is substantially vertical, the invention is not so limited. It could just as well be horizontal with the end face of the fiber and pedestal being vertical and normal thereto.

Plugs are mounted using the body as a reference surface. Although efforts are made to assure that the body axis and end portion axis are aligned, small disturbances such as molding flash or fixture misalignment can contribute to angular shift in the cone axis with respect to the axis of rotation of the turntable.

Prior to beginning the grinding of the truncated conically shaped end portion 50 of the plug 44, the centroid of the core 43 exposed on the end surface of the connector must lie on the axis of rotation of the turntable. Information is obtained as to misalignment from lateral offset by introducing light into the end of the terminated fiber which is not being processed, and processing by the machine vision system 110 light emitted from the end to be ground. Use of this information guarantees that the grinder apparatus 35 will shape a truncated cone around an axis, which intersects a well-defined position so that a mating part receives transmitted light at a well-defined position.

After the plug has been clamped in the apparatus 35, the turntable 130 is caused to rotate (see FIGS. 9-10) and light is caused to be launched into the other end of the optical fiber cable terminated by a plug which is held in the moveable chuck. The machine vision system 110 is used to determine the centroid of the fiber core 43 when the core is illuminated by light launched into the other end of the jumper cable. A microscope 160 is mounted on a slideable moveable arm 162 (see FIG. 1). The arm 162 is caused to be moved to position the microscope above the plug.

An objective lens is focused at the end face of the optical fiber 45 and the spot of light which is emitted from the optical fiber in the plug 44 passes through the objective lens and an eyepiece 168 of the microscope 160 and is incident on a photosensitive surface of a camera 170 of the machine vision system. In the preferred embodiment, the vision system 110 acquires an image, via the camera 170 connected to the microscope 160, of the sopt of light in 1/30th second, for example, by digitizing the analog output of the camera. Multiple observations are made at fixed angular intervals while the turntable rotates at a substantially constant rate, producing a set of observations which sample adequately a multiplicity of locations along a circular path which the spot of light traces out. These observations may be viewed by the operator on a monitor 174. In turn, this set of observations is used to deterime the center of rotation through processing of observational data, the center of rotation being the desired location of the centroid of the optical fiber core 43.

The center of rotation is determined in accordance with the following sequence of steps. Having acquired the set of digitized images described herein above, the machine vision system 110 performs a predetermined feature extraction and calculates the centroid of the spot of light for each image. The centroids thus obtained are provided to a computer 176 (see FIG. 9) such as one manufactured by AT&T and designated PC 6300 for the purpose of processing them further. A circle-fitting algorithm or averaging method is used to obtain the center of rotation and the radius of the circle on which the sopt is moving.

From this information the lateral distance vector necessary to be traversed to produce coincidence of the spot of light and the center of rotation is found. This information is used to generate commands to a driver 178 of the X-Y positioner 140 to move the chuck 110 appropriately. While this is being done, pictures are taken and processed and used to provide additional appropriate commands to the positoner. The use of this iterative procedure allows the plug 44 to be positioned such that the centroid of the core 43 of the end face of the optical fiber at the end of the pedestal is substantially coincident with the axis of rotation 125 of the turntable.

To illustrate the process further, it is important to understand that commands provided to the translator mechanism must cause the plug to be moved along the appropriate axis in the correct amount. A specific angular position called the "upright" position is used for reference (see FIG. 17). In the convention of this description as viewed from above the apparatus 35, X values increase from top to bottom in the plane of the drawings and Y values increase from left to right. FIG. 17 illustrates that at least two diametrically opposed images 181—181 may be acquired with the machine vision system 110 determining a centroid 183 of each. However, it is preferable that a plurality of images 185—185 (see FIG. 18) be acquired and their centroids 187—187 determined for analysis in finding the center of rotation as described earlier.

Having determined the center of rotation, single images are acquired at a prescribed point in the rotation of the turntable, i.e. the upright position, and are compared to the just-determined center. In response to these comparisons, commands are provided to the motors 157—157. In response to these commands, the motors 157—157 cause the plug to be shifted laterally in two dimensions, along a vector which tends to minimize the distance between the axis of rotation and the observed location of the spot of emitted light until the centroid 187 of the image of the fiber core 43 is aligned substantially with the axis of rotation 125 (see FIG. 19).

After it has been oriented, the truncated conically shaped end portion 50 of the plug 44 is ground to provide an end portion in which the end portion of the optical fiber is disposed such that the centroid of the crosssectional area of the light beam at the end face 57 coincides with the axis of rotation. As a result, the centroid of the fiber core 43 at the end face 57 is coincident with the axis of revolution of the end portion of the plug. After the new end portion is ground, the end face of the optical fiber 45 is repolished normal to the axis of the newly formed cone by using the methods and apparatus disclosed in priorly mentioned U.S. Pat. No. 4,539,776. Typically, 25 to 50 microns of material may be removed from the optical fiber end face and surrounding pedestal.

It should be understood that the above-described technique improves the yield of plugs molded for use in a biconic connector system. However, no detection or compensation for the exit angle of the as-molded plug is assumed here, nor has there been any compensation for the additional error due to the chuck itself. Given that only the lower portion of the plug 44 is held, such that the exposed end 50 of the plug can be reconfigured, random errors in the angular orientation of the mounted plugs are possible and, indeed, normally experienced. The addition of this random orientational error can introduce lateral offset in finished product, even after a perfect correction for offset, as a result of the final polishing operation see (FIG. 11).

This last-mentioned problem may be overcome by orienting the fiber end face 57, wihch is normal to the axis of revolution of the conical surface of the end portion of the plug 44 so that it is normal to the turntable axis 125 prior to making any observations of emitted light. Accordingly, it has been found that the yield may be improved significantly simply by leveling the end face of the plug 44 prior to the machine vision examination of the emitted light. In order to accomplish this, an angular position sensing device 190 (see FIG. 20A) may be placed over the end of the plug 44 prior to grinding (see FIG. 20B). The sensing device 190 which may comprise a bubble leveler includes a disc-like fixture 191 having an insert 192 which includes a conically shaped opening 193 for receiving the end portion of the conically shaped portion of the plug. The wall of the opening engages the conical end surface of the plug; the sensing device does not engage the end surface of the plug. Mounted within the fixture 191 are two leveling transducers 195 and 196, the two being at right angles to each other. The transducers are connected to a circuit 197, the purpose of which is to provide a linear DC output proportional to angular displacement. The output is provided to an analog-to-digital converter 198 and to the computer 176. As will be recalled, the computer 176 is connected to the driver 178 of the positioner 140. The spherical bearing 124 for the chuck 111 is released and the bearing is tilted until the sensing device shows that the end face of the plug is horizontal. The spherical bearing is clamped in position and plug is oriented vertically with its end face normal to the axis of rotation. Inasmuch as the apparatus 35 is level, the axis of rotation 125 is perpendicular to ground. The sensing device 190 insures that the axis of revolution of the end portion 50 of the plug 44 is parallel to the axis of rotation.

Accordingly, the yield may be improved by compensating for the inability of the plug holder to provide perfect alignment of the barrel of the plug so that the core 43 has its axis parallel to the rotational axis 125 of the turntable. However, it should be understood that the grinder apparatus need not have a perfectly vertical axis of rotation. What is required is a determination of the direction of the axis of rotation and the orientation of the conical axis with respect to that axis of rotation, and realignment of the latter with the former.

It is to be understood that the above-described arrangements are simply illustrative of the invention. Other arrangements may be devised by those skilled in the art which will embody the principles of the invention and fall within the spirit and scope thereof.

What is claimed is:

1. A method of reconfiguring an end portion of a plug, which is adapted to terminate an optical fiber, said method comprising the steps of:

holding the plug, which includes a passageway within which is adapted to be disposed an end portion of an optical fiber having a transverse cross section substantially equal to that of the passageway, on a support having an axis of rotation such that the end portion of the plug is exposed;

determining the location of the axis of rotation in an end face of the plug;

causing relative motion between the plug and the support to cause the plug to be moved in a manner to cause the centroid of the cross sectional area of a beam of light within the passageway at the end face of the plug to be moved to become disposed along the axis of rotation; and reconfiguring the end portion of the plug to cause the centroid of the cross-sectional area of the beam of light in the end face of the plug to be in a predetermined location with respect to an alignment surface of the reconfigured end portion.

2. The method of claim 1, wherein an end portion of the plug includes a surface generated about an axis of revolution and the end portion of the plug as reconfigured causes the centroid of the cross-sectional area of the light beam to be substantially coincident with the axis of revolution of the reconfigured end portion at the end face of the plug.

3. A plug which is adapted to terminate an end portion of an optical fiber, said plug being reconfigured in accordance with the method of claim 1.

4. An optical fiber cable having an end portion of an optical fiber thereof terminated with a plug which has been reconfigured in accordance with the method of claim 1.

5. A method of reconfiguring an end portion of a plug, which is adapted to terminate an optical fiber, said method comprising the steps of:

holding the plug, which includes a passageway within which is adapted to be disposed an end portion of an optical fiber and which includes an end portion including an alignment surface generated about an axis of revolution, on a support having an axis of rotation such that the end portion of the plug is exposed;

determining the location of the axis of rotation in an end face of the plug;

causing relative motion between the plug and the support to cause the centroid of the cross sectional area of a beam of light within the passageway at the end face of the plug to be disposed along the axis of rotation; and reconfiguring the end portion of the plug to cause the centroid of the cross-sectional area of the beam of light in the end face of the plug to be substantially coincident with the axis of revolution of the alignment surface of the reconfigured end portion at the end face of the plug, wherein the step of reconfiguring is accomplished while the plug is being turned.

6. A method of adjusting an end portion of a truncated conically shaped plug, which includes a passageway in which is disposed an end portion of an optical fiber having a core and having a transverse cross section substantially equal to that of the passageway, to cause a centroid of the optical fiber core at an end face of the plug be disposed along the axis of revolution of the end portion of the plug, said method including the steps of:

holding the plug on a support having a axis of rotation, the plug being held such that the end portion of the plug is exposed;

launching a beam of light along the core of the end portion of the optical fiber in the passageway;

acquiring an image of the illuminated cross-sectional area of the beam of light at the intersection of the beam with the end face of the end portion; while moving the plug to cause relative circular motion between the light beam and a device which is used to acquire images of the light beam at a plurality of circumferentially spaced locations;

determining the centroid of the cross sectional area of the light beam at each location;

determining the location of the center of rotation of the support;

causing the centroid of the cross sectional area of the light beam to be substantially coincident with the center of rotation; then reconfiguring the end portion of the plug to cause the centroid of the cross sectional area of the light beam to be coincident with the axis of revolution of the reconfigured end portion within the end face of the plug.

7. The method of claim 6, wherein the axis of revolution of the end portion is caused to be parallel to the axis of rotation and the reconfiguring is accomplished to cause the centroid to be coincident with the axis of revolution of the reconfigured end portion of the plug.

8. A method of adjusting an end portion of a truncated conically shaped plug, which includes a passageway in which is disposed an end portion of an optical fiber having a core, to cause a centroid of the optical fiber core at an end face of the plug be disposed along the axis of revolution of the end portion of the plug, said method including the steps of:

holding the plug on a support having an axis of rotation, the plug being held such that the end portion of the plug is exposed;

launching a beam of light along the core of the end portion of the optical fiber in the passageway;

acquiring an image of the illuminated cross-sectional area of the beam of light at the intersection of the beam with the end face of the end portion; while causing relative circular motion between the light beam and a device which is used to acquire images of the light beam at a plurality of circumferentially spaced locations;

determining the centroid of the cross sectional area of the light beam at each location;

determining the location of the center of rotation of the support;

moving the plug to cause the centroid of the cross sectional area of the light beam to be substantially coincident with the center of rotation; then reconfiguring the end portion of the plug to cause the centroid of the cross sectional area of the light beam to be coincident with the axis of revolution of the reconfigured end portion within the end face of the plug, wherein the step of reconfiguring is accomplished while the plug is being turned.

9. A method of adjusting an end portion of a plug, which includes a passageway that is adapted to receive an end portion of an optical fiber and that has a transverse cross section substantially the same as that of the optical fiber, said method comprising the steps of:
holding the plug in a support having an axis of rotation, the plug being held such that the end portion of the plug is exposed;
causing relative motion between the axis of rotation and the plug to cause an axis of the end portion of the plug to be parallel to the axis of rotation;
determining the location of the axis of rotation in an end face of the plug;
causing relative motion between the plug and the support to cause the plug to be moved in a manner which causes the centroid of the cross sectional area of a beam of light at an end face of the plug to be moved to become disposed along the axis of rotation; and
reconfiguring the exposed end portion of the plug to cause the centroid of the cross sectional area of the light beam in the end face to be in a predetermined location with respect to an alignment surface of the reconfigured end portion of the plug.

10. The method of claim 9, wherein a length of an optical fiber is terminated by the plug and the beam of light is launched into and through a core of the optical fiber.

11. The method of claim 9, wherein the beam of light is launched into and through the passageway of the plug.

12. A plug which is adapted to terminate an end portion of an optical fiber, said plug being reconfigured in accordance with the method of claim 7.

13. An optical fiber cable having an end portion of an optical fiber thereof terminated with a plug which has been reconfigured in accordance with the method of claim 9.

14. An apparatus for reconfiguring an end portion of a plug, which is adapted to terminate an optical fiber, said apparatus comprising:
support means having an axis of rotation for holding a plug along a portion of the plug spaced from the end portion which includes a passageway that is adapted to receive an end portion of an optical fiber;
light means for launching a beam of light along the passageway;
means for determining the location of the axis of rotation in an end face of the plug;
means for moving the plug to cause the centroid of the cross sectional area of the beam of light at its intersection with the end face of the plug to be disposed along the axis of rotation; and
means for reconfiguring the end portion of the plug to cause the centroid of the cross sectional area of the beam of light in the end face of the plug to be in a predetermined location with respect to an alignment surface of the reconfigured end portion of the plug.

15. An apparatus for adjusting a truncated conically shaped end portion of a plug, which includes a passageway having a transverse cross section substantially equal to that of an optical fiber received in the passageway and terminated by the plug, to cause a centroid of the fiber core in an end face of the plug to be disposed along the axis of revolution of a conical surface of the end portion of the plug, said apparatus comprising:
support means having an axis of rotation for holding the plug, which includes a passageway adapted to receive an end portion of an optical fiber, in such a manner that the end portion of the plug is exposed;
means for launching light along the fiber core of the end portion of the optical fiber in the passageway;
means for acquiring an image of the illuminated cross sctional area of the path along which the light travels;
means for causing relative circular motion between the path and said means for acquiring an image to obtain at least two images of the illuminated core at circumferentially spaced locations;
means for determining the centroid of the cross sectional area of the beam of light at each location and for determining the center of rotation of said support means;
translating means for moving the plug to cause the centroid of the cross sectional area of the beam of light to be coincident with the center of rotation of said support means in the end face of the plug; and
means rendered effective subsequent to movement of said plug by said translating means for reconfiguring the end portion of the plug to cause the centroid of the cross sectional area of the beam of light to be coincident with the axis of revolution of the reconfigured end portion.

16. The apparatus of claim 15, wherein said means for causing relative circular motion comprises a rotatably mounted turntable.

17. The apparatus fo claim 16, wherein said means for acquiring an image comprises a machine vision system.

18. The apparatus of claim 17, wherein said support means includes a portion which is adapted to be moved in coordinate directions.

19. The apparatus of claim 17, wherein the machine vision system include provisions for digitizing and segmenting the light of each acquired image.

20. The apparatus of claim 15, wherein said translating means includes a general purpose digital computer.

21. The apparatus of claim 20, wherein said translating means also includes a motor which is associated with each coordinate direction, the motors being controlled by said computer.

22. The apparatus of claim 15, wherein said means for acquiring the images includes means for acquiring the image in analog form and means for converting the image into binary form.

23. The apparatus of claim 22, which includes feature extraction means for extracting the location of the illuminated light path from the image.

24. The apparatus of claim 15, wherein said support means includes a pedestal which supports the plug, said pedestal being mounted on a turntable.

25. The apparatus of claim 24, which also includes means for moving said pedestal in coordinate directions.

* * * * *